United States Patent
Johansson et al.

(10) Patent No.: US 9,315,104 B2
(45) Date of Patent: Apr. 19, 2016

(54) DRIVER INTERACTION PERTAINING TO REFERENCE-SPEED-REGULATING CRUISE CONTROL

(75) Inventors: Oskar Johansson, Stockholm (SE); Maria Södergren, Segeltorp (SE); Fredrik Roos, Segeltorp (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/116,446

(22) PCT Filed: May 9, 2012

(86) PCT No.: PCT/SE2012/050489
§ 371 (c)(1),
(2), (4) Date: Nov. 8, 2013

(87) PCT Pub. No.: WO2012/158098
PCT Pub. Date: Nov. 22, 2012

(65) Prior Publication Data
US 2014/0074371 A1 Mar. 13, 2014

(30) Foreign Application Priority Data
May 16, 2011 (SE) .................................. 1150442

(51) Int. Cl.
*B60K 31/00* (2006.01)
*B60W 30/14* (2006.01)

(52) U.S. Cl.
CPC .............. *B60K 31/00* (2013.01); *B60W 30/143* (2013.01); *B60K 2310/244* (2013.01); *B60W 2550/143* (2013.01); *B60W 2550/402* (2013.01)

(58) Field of Classification Search
CPC ..................... B60W 30/143; B60W 2550/143; B60W 2550/402; B60W 31/00; B60K 2310/244
See application file for complete search history.

(56) References Cited

U.S. PATENT DOCUMENTS 6,185,499 B1 * 2/2001 Kinoshita et al. .............. 701/96
8,849,539 B2 * 9/2014 Johansson et al. ............. 701/93
(Continued)

FOREIGN PATENT DOCUMENTS

DE 1994 7313 A1 4/2001
EP 1 063 119 A2 12/2000
(Continued)

OTHER PUBLICATIONS

Serafin, Colleen. "Driver preferences and usability of adjustable distance controls for an Adaptive Cruise Control (ACC) system." Ford Motor Company Systems Technology Inc (1996).*
(Continued)

*Primary Examiner* — John Q Nguyen
*Assistant Examiner* — Alan D Hutchinson
(74) *Attorney, Agent, or Firm* — Ostrolenk Faber LLP

(57) ABSTRACT

A method for operation of a reference-speed-regulating cruise control and a reference-speed-regulating cruise control which demands from a vehicle engine system a reference speed $v_{ref}$ which may differ from a chosen set speed $v_{set}$. Adjustment of at least the set speed $v_{set}$ is allowed if the reference speed $v_{ref}$ differs from the set speed $v_{set}$, which adjustment is based at least partly on a current speed $v_{pres}$ of the vehicle and on input from a user of the reference-speed-regulating cruise control. Quick and simple user-controlled adjustment of the set speed $v_{set}$ is thus achieved.

11 Claims, 5 Drawing Sheets

(56) References Cited

U.S. PATENT DOCUMENTS

Figure 1:
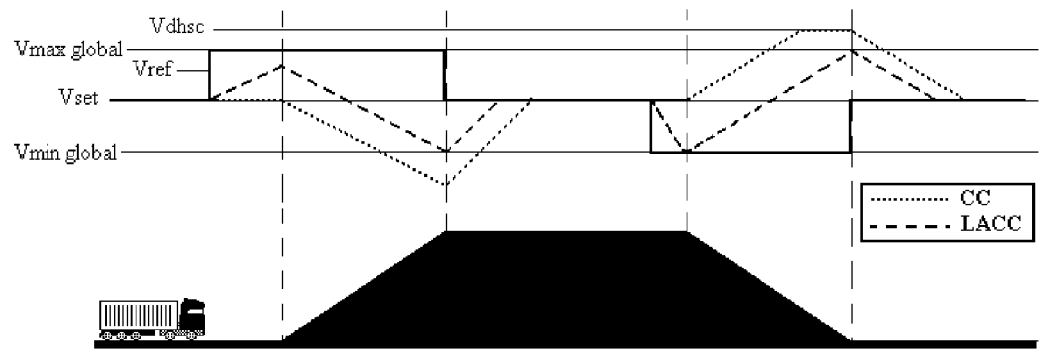

| | | | |
|---|---|---|---|
| 2008/0162011 | A1 | 7/2008 | Pfeiffer et al. |
| 2008/0306668 | A1 | 12/2008 | Wang et al. |
| 2009/0037071 | A1* | 2/2009 | Inoue .............................. 701/96 |
| 2010/0217494 | A1* | 8/2010 | Heft et al. ........................ 701/70 |
| 2010/0318273 | A1 | 12/2010 | Aleksic et al. |

FOREIGN PATENT DOCUMENTS

| | | |
|---|---|---|
| JP | 61-278427 | 12/1986 |
| JP | 62-061833 | 3/1987 |
| JP | 2001 328452 | 11/2001 |
| KR | 10-2009-0062527 | 6/2009 |
| WO | WO 2010 144031 A1 | 12/2010 |

OTHER PUBLICATIONS

International Search Report dated Aug. 23, 2012 issued in corresponding International patent application No. PCT/SE2012/050489.

International Preliminary Report on Patentability dated Jun. 27, 2012 issued in corresponding International patent application No. PCT/SE2012/050489.

Japanese Office Action, dated Mar. 17, 2015, issued in corresponding Japanese Patent Application No. 2014-511321. English translation. Total 2 pages.

Korean Office Action mailed Feb. 24, 2015 in corresponding Korean Patent Application No. 10-2013-7033439, along with an English language translation thereof.

* cited by examiner

DRIVER INTERACTION PERTAINING TO REFERENCE-SPEED-REGULATING CRUISE CONTROL

CROSS-REFERENCE TO RELATED APPLICATIONS

The present application is a 35 U.S.C. §§371 national phase conversion of PCT/SE2012/050489, filed May 9, 2012, which claims priority of Swedish Patent Application No. 1150442-0, filed May 16, 2011 the contents of which are incorporated by reference herein. The PCT International Application was published in the English language.

TECHNICAL FIELD

The present invention relates to a method for a reference-speed-regulating cruise control and a reference-speed-regulating cruise control. The present invention relates also to a computer program and a computer program product which implement the method according to the invention.

BACKGROUND

Motor vehicles today, e.g. cars, trucks and buses, are usually provided with cruise control. An object of cruise control is to achieve a uniform predetermined vehicle speed. This is done either by adjusting the engine torque to avoid retardation, or by applying brake action on downhill runs where the vehicle is accelerated by its own weight. A more general object of cruise control is to achieve convenient driving and greater comfort for the vehicle's driver.

A driver of a motor vehicle with cruise control usually chooses a set speed $v_{set}$ as the speed which he/she wishes the vehicle to maintain as long as possible on level roads, depending for example on engine performance and vehicle weight or on whether there is another vehicle moving at low speed in front. A cruise control then provides an engine of the vehicle with a reference speed $v_{ref}$ which is used for controlling the engine. The set speed $v_{set}$ may therefore be regarded as an input signal to the cruise control, and the reference speed $v_{ref}$ as an output signal from the cruise control, which is used for controlling the engine.

In today's traditional cruise controls (CC), the reference speed $v_{ref}$ is identical with the set speed $v_{set}$ set by the user of the system, e.g. a driver of the vehicle. Today's traditional cruise controls therefore maintain a constant reference speed corresponding to the set speed $v_{set}$ set by the driver. The value of the reference speed $v_{ref}$ is here altered only when the user him/herself adjusts it during the journey.

There are today cruise controls, so-called reference-speed-regulating cruise controls, e.g. Ecocruise cruise control, which try to estimate current running resistance and also have knowledge of historical running resistance.

An experienced driver using a vehicle without cruise control can reduce fuel consumption by adapting his/her driving to the characteristics of the road ahead so that unnecessary braking and/or fuel-consuming acceleration can be avoided. A further development of these reference-speed-regulating cruise controls tries to mimic the experienced driver's adaptive driving on the basis of knowledge of the road ahead, so that fuel consumption can be kept as low as possible, since this very greatly affects profitability for an owner of the vehicle, e.g. a haulage company or the like.

An example of such a further development of a reference-speed-regulating cruise control is a "look ahead" cruise control (LACC), i.e. a strategic cruise control which uses knowledge of sections of road ahead, i.e. knowledge of the nature of the road in front, to determine the configuration of the reference speed $v_{ref}$. Here the reference speed $v_{ref}$ is therefore allowed, within a speed range, to differ from the set speed $v_{set}$ chosen by the driver, in order to drive in a way which saves more fuel but is also more comfortable and safer.

Knowledge of the road section ahead may for example comprise prevailing topography, road curvature, traffic situation, roadworks, traffic density and state of the road. It may also comprise a speed limit for the road section ahead and a traffic sign beside the road. This knowledge may for example be obtained from location information, e.g. GPS (global positioning system) information, map information and/or topographical map information, weather reports, information communicated between different vehicles and information communicated by radio. These different types of knowledge may be used in various ways. For example, knowledge of a speed limit ahead may be used for fuel efficiency by lowering the vehicle's speed before the speed limit zone is reached. Similarly, knowledge of a road sign conveying information about, for example, a roundabout or intersection ahead may also be used for fuel efficiency by braking before reaching the roundabout or intersection.

A reference-speed-regulating cruise control may, for example, predict the vehicle's speed along a horizon of any suitable length, e.g. about 1-2 km. The vehicle's future speed along the horizon is predicted in various ways such as driving with traditional cruise control at a reference speed $v_{ref}$ which is the same as the set speed $v_{set}$, or varying the reference speed $v_{ref}$ relative to the set speed $v_{set}$.

A look-ahead cruise control (LACC), for example, allows the reference speed $v_{ref}$ to be raised, before a steep climb, to a level above the set speed $u_{set}$, since the vehicle will presumably lose speed on the steep upgrade owing to high train weight relative to engine performance. Similarly, the LACC allows the reference speed $v_{ref}$ to drop to a level below the set-speed $v_{set}$ before a steep downgrade, since on such a downhill run the vehicle will presumably be accelerated by its high train weight. The concept here is that it is better from a fuel economy perspective to take advantage of the vehicle's acceleration by its own weight downhill than to initially accelerate before the downgrade and then brake downhill. The LACC can thus reduce fuel consumption without journey time being affected, while at the same time achieving comfortable and safe driving.

There are also cruise controls which use a current running resistance as a basis for deciding how the vehicle's speed should vary. This means that the reference speed $v_{ref}$ in these cruise controls can be allowed to deviate from the set speed $v_{set}$ on the basis of at least one characteristic of the running resistance, e.g. its magnitude and/or pattern over time.

BRIEF DESCRIPTION OF THE INVENTION

As mentioned above, an LACC has knowledge of the vehicle's location and local topography, but other parameters may also affect the reference speed $v_{ref}$ which a driver wishes the system to use as an output signal. Such parameters may comprise for example other road users and how they behave in traffic. Another such parameter might be a prevailing traffic situation, e.g. roadworks.

It is very important when using the reference-speed-regulating cruise control that the vehicle should behave in such a way as to conform to the driver's intentions. If it does not, there is an imminent risk that the driver might choose to switch off or not switch on the reference-speed-regulating cruise control.

The driver choosing not to use the reference-speed-regulating cruise control might well cause total fuel consumption to rise.

An object of the present invention is to propose a reference-speed-regulating cruise control which a user feels in control of and which at the same time causes a vehicle to be driven in a way which saves fuel and is comfortable and/or safe.

This object is achieved by the aforesaid method for a reference-speed-regulating cruise control. It is also achieved by the aforesaid reference-speed-regulating cruise control and by the aforesaid computer program and computer program product.

According to the present invention, adjustment of at least the set speed $v_{set}$ is allowed if the reference speed $v_{ref}$ for the reference-speed-regulating cruise control differs from the set speed $v_{set}$, i.e. if $v_{ref} \neq v_{set}$. This adjustment is based, according to the present invention, at least partly on a current speed $v_{pres}$ and on input from the user of the reference-speed-regulating cruise control.

Where the adjustment according to the invention is related to the current speed $v_{pres}$, the user may for example use a single input, e.g. a single button pressure, to adjust a value for the set speed $v_{set}$ up or down substantially, particularly if the current speed $v_{pres}$ is not close to the previous set speed $v_{set}$. In prior art the user had to make repeated inputs in small steps each adjusting the set speed $v_{set}$ to only a small extent, which a user of the cruise control might find troublesome and not user-friendly. With the present invention, a single input from the user therefore causes the set speed $v_{set}$ to take a large step and stop at a value related to the vehicle's current speed $v_{pres}$. As this "longer stride" corresponds better to the driver's intention, he/she will find the function of the present invention intuitively good.

With regard to traffic safety, it is also advantageous that the driver of a vehicle should be able by a few simple inputs to adjust the set speed $v_{set}$ without loss of concentration on the section of road ahead.

The present invention allows a user of the reference-speed-regulating cruise control to alter the set speed $v_{set}$ so that it becomes related to the current speed $v_{pres}$. This makes it possible for the user, who may be a driver of the vehicle, to feel that he/she can quickly adjust the set speed $v_{set}$ for the reference-speed-regulating cruise control and hence the vehicle's speed, which many users will find very positive. This positive feeling of being able quickly to control the vehicle's speed when it is being controlled by the reference-speed-regulating cruise control may then increase a driver's willingness to use, and/or reduce the risk of his/her switching off, the reference-speed-regulating cruise control, which may for example be an adaptive cruise control (ACC) or a cruise control which uses knowledge of sections of road ahead.

The driver's wish to be able effectively to influence the vehicle's speed is thus affirmed by using the invention. The overall result when use of the reference-speed-regulating cruise control increases as a result of greater driver acceptance of its function is driving which is more comfortable for the driver and reduced fuel consumption.

According to various embodiments of the invention, the set speed $v_{set}$ is set, on the basis of driver input and the vehicle's current speed $v_{pres}$, to different values appropriate to different driving situations. This is advantageous when the driver often wishes to alter the set speed to a value about the vehicle's current speed $v_{pres}$ and is therefore not usually interested in making small adjustments of the set speed $v_{set}$ about a value which is not relevant, i.e. about a set speed $v_{set}$ which differs relatively greatly from the vehicle's current speed $v_{pres}$. These embodiments make it possible for the driver to concentrate on the road ahead and/or other road users rather than being distracted by illogical handling of cruise control parameters.

For example, according to an embodiment an input results in the set speed $v_{set}$ being set to an upwardly adjusted value $v_{pres}+v_{adj}$ of the current speed so that $v_{set}=v_{pres}+v_{adj}$. This is advantageous when the driver's preferred speed is close to the current speed $v_{pres}$ but not close to the set speed $v_{set}$, since the adjustment can here be made by a single input.

According to another embodiment the input results in the set speed $v_{set}$ being set to a downwardly adjusted value $v_{pres}-v_{adj}$ of said current speed, so that $v_{set}=v_{pres}-v_{adj}$. This is advantageous if the driver's preferred speed is close to the current speed $v_{pres}$ but not close to the set speed $v_{set}$.

If for example the current speed $v_{pres}$ differs substantially from the initial set speed $v_{set}$, only one input by the driver is needed. Repeated inputs to reach a desired different set speed $v_{set}$ therefore need not be entered by the driver.

According to another embodiment the input results in the set speed $v_{set}$ being actually set to the current speed $v_{pres}$ so that $v_{set}=v_{pres}$. This is advantageous when the current speed $v_{pres}$ differs substantially from the initial set speed $v_{set}$. This is advantageous if the driver's preferred speed corresponds to the current speed $v_{pres}$ but is not close to the set speed $v_{set}$. A single input by the driver results here in a relatively large change in the set speed $v_{set}$.

In this specification, the invention is exemplified for use in a cruise control system such as a look-ahead cruise control (LACC), i.e. a strategic cruise control which can use knowledge of the nature of the road ahead to control the reference speed $v_{ref}$. The invention may however be implemented in substantially any cruise control in which the reference speed $v_{ref}$ can be allowed to differ from the set speed $v_{set}$.

BRIEF LIST OF DRAWINGS

Figure 2:
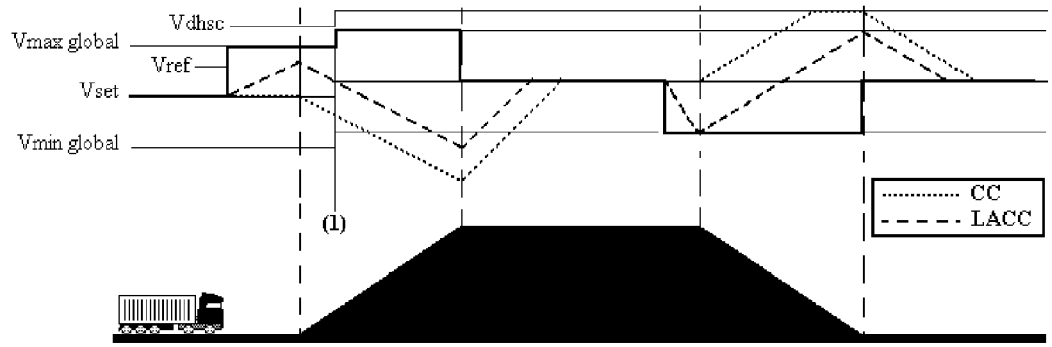
Figure 3:
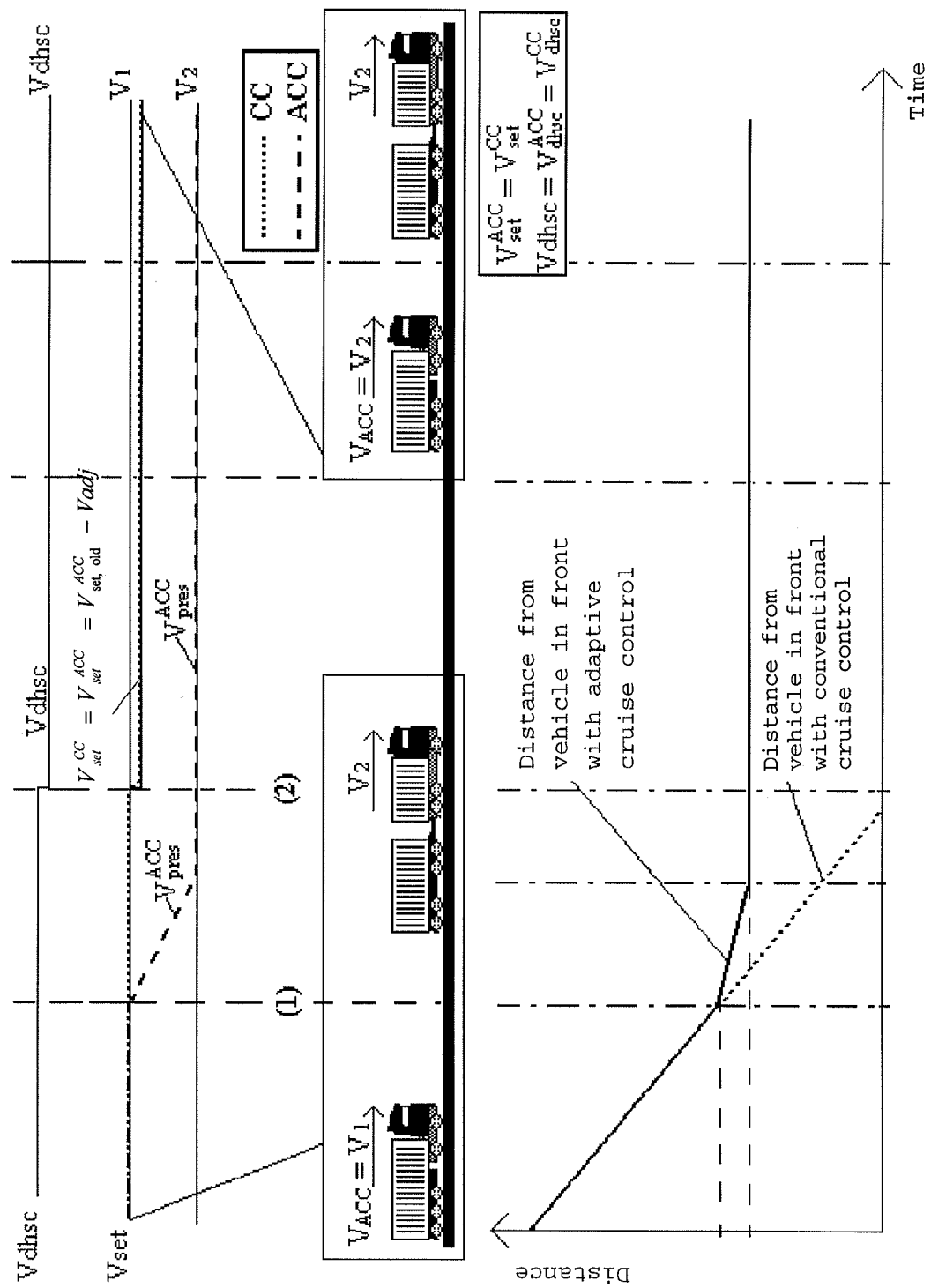
Figure 4:
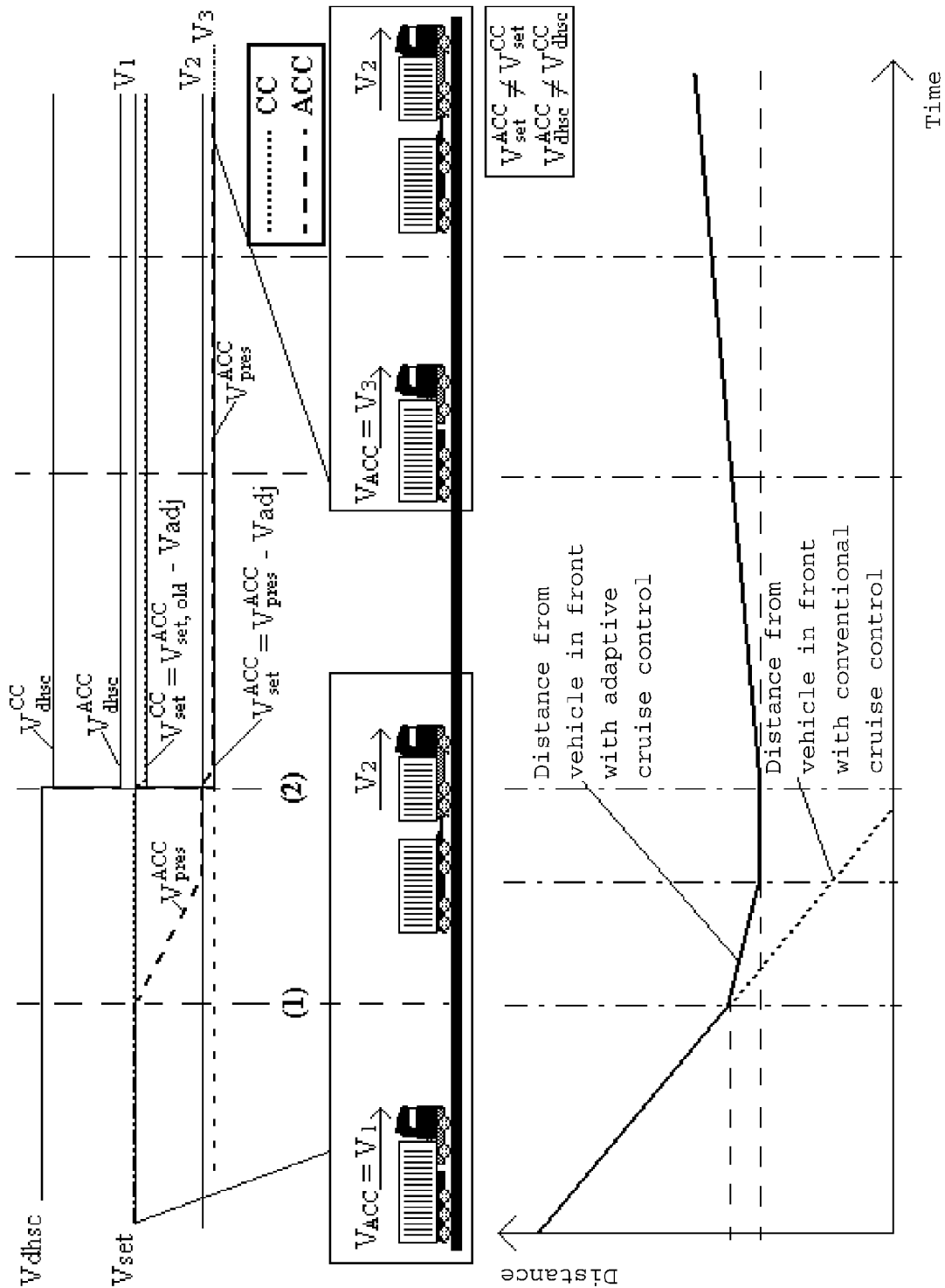
Figure 5:
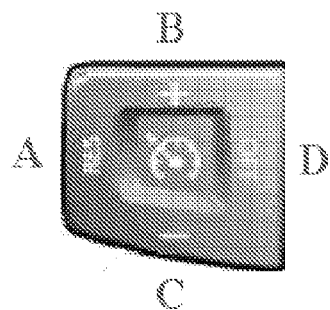
Figure 7:
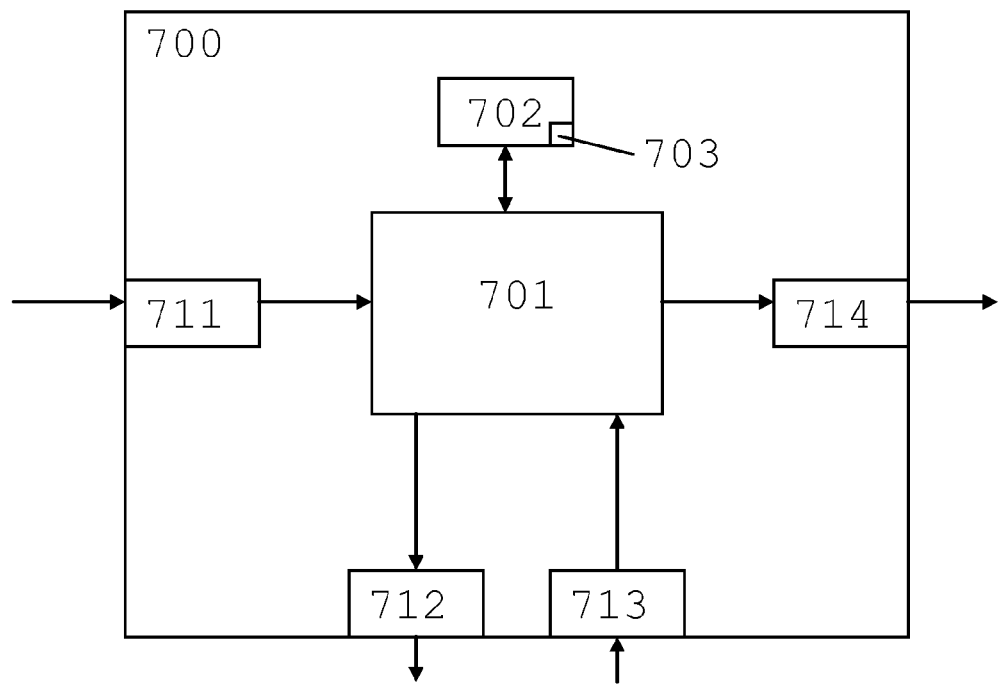
Figure 6:
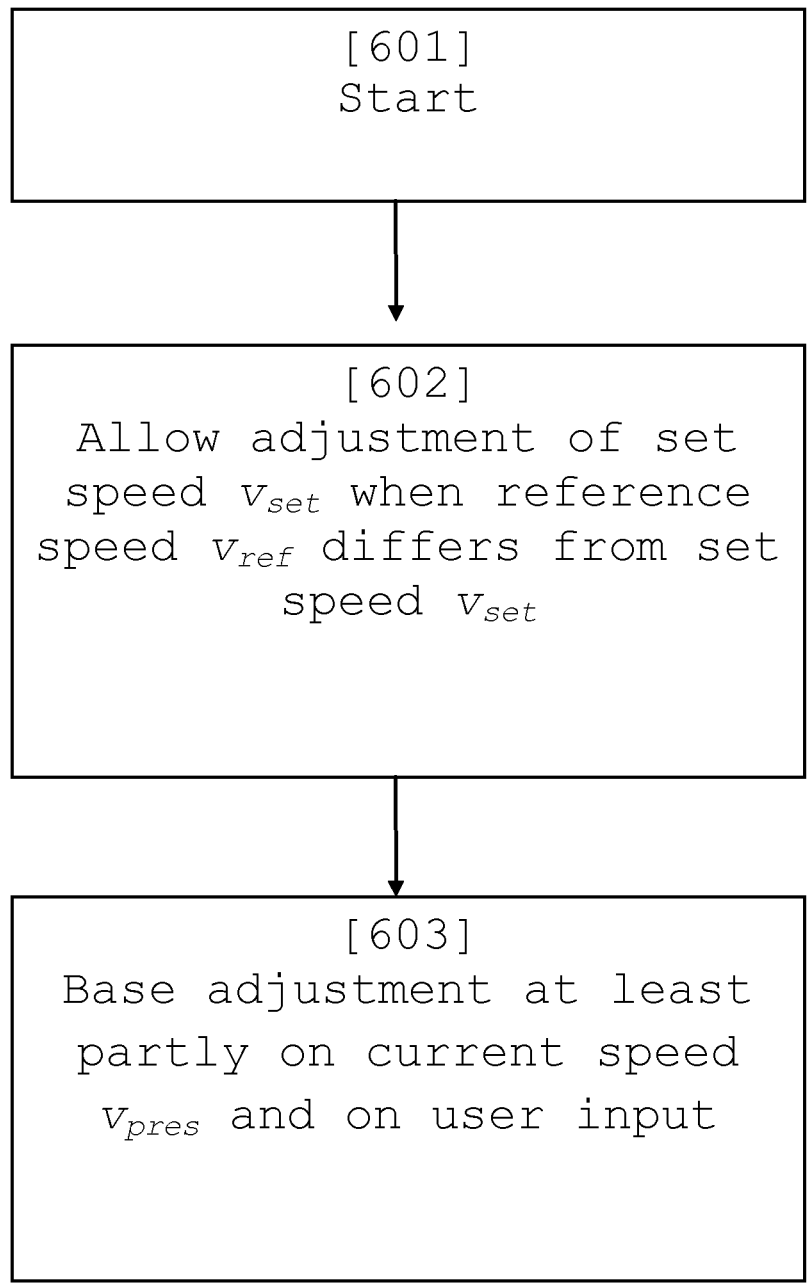

The invention is explained in more detail below with reference to the attached drawings, in which the same reference notations are used for similar items, and in which:

FIG. 1 depicts an example of speeds in a driving situation,
FIG. 2 depicts an example of speeds in a driving situation,
FIG. 3 depicts an example of speeds in a driving situation,
FIG. 4 depicts an example of speeds in a driving situation,
FIG. 5 depicts an example of an input device,
FIG. 6 is a flowchart for the method according to the invention,
FIG. 7 depicts a control unit which works according to the invention.

DESCRIPTION OF PREFERRED EMBODIMENTS

The present invention allows a user of the reference-speed-regulating cruise control to influence the set speed $v_{set}$ so that it becomes related to a current speed $v_{pres}$ of the vehicle. The present invention allows this adjustment when the reference speed $v_{ref}$ for the reference-speed-regulating cruise control differs from the set speed $v_{set}$. This adjustment is based at least partly on input from the user of the reference-speed-regulating cruise control and on a current speed $v_{pres}$ of the vehicle.

The user of the reference-speed-regulating cruise control is thus able to make a relatively large adjustment of the set speed $v_{set}$ by a single input, e.g. a single button pressure, so that the adjusted set speed $v_{set}$ assumes a value related to the vehicle's current speed $v_{pres}$. Being easily able to adjust the set speed $v_{set}$ to a value equal or close to the vehicle's current speed $v_{pres}$ is a facility which a user will be willing to use relatively often, since it is easier for a driver to relate to a current speed $v_{pres}$ at which the vehicle is actually travelling at a given time than to the set speed $v_{set}$, since the latter feels more abstract to the driver. It is therefore highly advantageous for a user to be able to effect this adjustment by as few inputs as possible, for both driver convenience and traffic safety reasons. The present invention thus makes it possible for this adjustment to be effected by a single input from the user.

According to an embodiment of the present invention, the set speed $v_{set}$ is set to a current speed $v_{pres}$ of the vehicle, so that $v_{set}=v_{pres}$, when the user is allowed to alter the set speed $v_{set}$ by input. The result is a set speed $v_{set}$ to which a driver of the vehicle can immediately relate in speed terms, since it is precisely the speed which the vehicle is maintaining when the adjustment is made. This embodiment is illustrated in FIG. 2 and described below.

FIG. 1 depicts an example of what a speed for a vehicle with a traditional cruise control (CC: dotted line) would be like on a section of road where an upgrade is followed by a plateau and a downgrade. With a traditional cruise control the reference speed $v_{ref}$ is set equal to the set speed $v_{set}$ all the time. The economical cruise control endeavours where possible to keep the vehicle's speed within the range between an overall lowest permissible speed $v_{min\ glob}$ and an overall highest permissible speed $v_{max\ glob}$. However, these lowest and highest permissible speeds are primarily intended to serve as limits for the speeds which are permissible on a hill in order to ensure that the vehicle's speed undergoes optimum variation in relation to prioritisation of driving time and/or fuel consumption. The lowest permissible speed $v_{min\ glob}$ therefore indicates how great the vehicle's speed is allowed to be before a downgrade, and the highest permissible speed $v_{max\ glob}$ indicates how great it is allowed to be before an upgrade.

The diagram shows that the vehicle's speed with traditional cruise control (CC) is below an overall lowest permissible speed $v_{min\ glob}$ at the crest of the hill and above the overall highest permissible speed $v_{max\ glob}$ at the end of the downgrade. This in itself is not too serious, but what from the fuel saving perspective is serious is that the vehicle's speed is actually braked away by the constant speed brake when a downhill speed control (DHSC) speed $v_{dhsc}$ is reached. A constant speed brake regulates the speed of for example heavy vehicles on downgrades by using auxiliary brakes, e.g. a retarder and an exhaust brake, a four-stage electromagnetic brake (Telma) and/or a Volvo exhaust brake (VEB). The traditional cruise control is therefore not optimum for downhill speed control.

FIG. 1 also illustrates an example of what a speed of a vehicle with a look-ahead cruise control (LACC: broken line) would be like. The LACC bases the reference speed $v_{ref}$ (bold continuous line) inter alia on the set speed $v_{set}$ and on knowledge of topographical information, e.g. information about the upgrade, plateau and downgrade in FIG. 1. The diagram shows that the LACC does not go below the overall lowest permissible speed $v_{min\ glob}$ at the crest of the hill, since the reference speed $v_{ref}$ is allowed to exceed the set speed $v_{set}$ before and during the uphill run. Nor is the overall highest permissible speed $v_{max\ glob}$ exceeded with the LACC, since the reference speed $v_{ref}$ is allowed to be lower than the set speed $v_{set}$ before and during the downhill run. The LACC thus allows the reference speed $v_{ref}$ to differ from the set speed $v_{set}$. FIG. 1 shows what the LACC thinks the reference speed $v_{ref}$ should be like for the LACC's cost function to be optimised. No energy is braked away by the constant speed brake when the LACC is used, which is optimum from the fuel saving perspective.

FIG. 2 illustrates an example of an embodiment of the present invention in which the set speed $v_{set}$ at the time (1) is set to a current speed $v_{pres}$ of the vehicle, so that $v_{set}=v_{pres}$ on the basis of user input. The diagram shows that the levels for the overall lowest permissible speed $v_{min\ glob}$, the overall highest permissible speed $v_{max\ glob}$ and the constant speed brake speed $v_{dhsc}$ are also adjusted. The pattern of the reference-speed-regulating cruise control (broken line in FIG. 2) is very similar to the optimum pattern according to FIG. 1 but increases the driver's comfort and feeling of being in control.

According to an embodiment of the present invention, a user input sets the set speed $v_{set}$ to an upwardly adjusted value $v_{pres}+v_{adj}$ for the current speed so that $v_{set}=v_{pres}+v_{adj}$. The result is a set speed $v_{set}$ which is close to the speed $v_{pres}$ which the vehicle is maintaining at the adjustment, but is adjusted somewhat upwards, resulting in very simple and quick input for the user.

According to another embodiment, the input sets the set speed $v_{set}$ to a downwardly adjusted value $v_{pres}-v_{adj}$ for said current speed so that $v_{set}=v_{pres}-v_{adj}$. This embodiment likewise results in very simple and quick input for the user.

FIGS. 3 and 4 illustrate an example of how the present invention may influence an adaptive cruise control (ACC). An ACC uses a radar to maintain relative to a vehicle in front a time gap which corresponds to a certain distance on a level road if the vehicle in front is initially travelling at a lower speed than the vehicle with ACC. A vehicle with ACC is therefore braked when catching up with another vehicle so that a substantially constant gap is maintained between the two vehicles. The diagrams also illustrate the function of a conventional cruise control (CC) which takes no account of the speed of the vehicle in front. The function of the CC is depicted to illustrate the advantages of the ACC function.

FIG. 3 depicts a scenario in which the present invention is not implemented, to illustrate the difference between the function as in prior art and as in the present invention.

FIG. 3 depicts on the left a tractor unit which has a semitrailer coupled to it and is following a truck which has a trailer. The tractor unit with the semitrailer is equipped with ACC. This depiction on the left illustrates an initial stage of a relationship between the vehicles where the tractor unit with semitrailer is catching up with the truck and trailer, a situation which pertains to the beginning of the speed graph at the top of the diagram.

Initially the tractor unit with semitrailer and ACC is travelling at a speed $v_{ACC}$ (broken line) with a first value $v_{ACC}=v_1$ which is higher than a second speed $v_2$ of the truck and trailer in front. This first speed $v_1$ is controlled by a set speed set by, for example, the vehicle's driver. The ACC function begins to influence the tractor unit's speed at a first time (1) by lowering its actual speed $v_{pres}$ to the second speed $v_2$ and thereby preventing the tractor unit and semitrailer from running into the truck and trailer. After this lowering of the tractor unit's actual speed $v_{pres}$ to the same speed $v_2$ as the truck and trailer in front so that $v_{pres}=v_2$, there will between the two vehicles a substantially constant time gap corresponding to a substantially constant distance on a level road. This situation is depicted on the right in FIG. 3, in which the speed $v_{ACC}$ of the tractor unit and semitrailer is substantially the same as the speed $v_2$ of the truck and trailer, i.e. $v_{ACC}=v_2$.

The distance graph at the bottom of FIG. 3 illustrates how the distance between the tractor unit with ACC and the truck and trailer changes (continuous line). The distance decreases until at the first time (1) the ACC function lowers the speed $v_{ACC}$ of the tractor unit to the same value as the truck and trailer so that $v_{ACC}=v_2$, with the result that after a while the distance is constant.

At a second time (2) the user adjusts the ACC's set speed $v_{set\,ACC}$ to $v_{set\,ACC,\,old} - v_{adj}$ (in this specification $v_{set\,ACC,\,old}$ denotes the set speed $v_{set\,ACC}$ before the adjustment is made). As may be seen in FIG. 3, this adjustment affects only the tractor unit's set speed but not its actual speed $v_{pres}$. The driver will feel that his/her inputs are of no significance and that he/she has no real control over the vehicle.

FIG. 3 also illustrates what the speed and distance between the vehicles would be like if the tractor unit with semitrailer was equipped with a conventional cruise control (CC) not using radar to adjust the vehicle's speed on the basis of that of the vehicle in front. As the speed graph indicates, the tractor unit's speed $v_{CC}$ follows the set speed $v_{set\,CC}$ entered by the user. This would result in the tractor unit with conventional cruise control running into the truck and trailer if its driver did not intervene. This is because the tractor unit's speed is here continually greater than that of the truck and trailer.

It should be noted here that the respective set speeds for the ACC and the conventional cruise control, viz. $v_{set\,ACC}$ and $v_{set\,CC}$, are eventually equal in this example, i.e. $v_{set} = v_{set\,ACC} = v_{set\,CC}$, and that the respective constant speed brake speeds $v_{dhsc\,ACC}$ and $V_{dhsc\,CC}$ are equal in this example, i.e. $v_{dhsc} = v_{dhsc\,ACC} = v_{dhsc\,CC}$.

FIG. 4 illustrates an example of how the present invention may influence an adaptive cruise control (ACC). FIG. 4 is constructed in a similar way to FIG. 3, i.e. on the left an initial scenario with a tractor unit which has a semitrailer coupled to it, is equipped with ACC and is catching up with a truck with a trailer, since the tractor unit is travelling at a higher speed $V_{ACC} = v_1$ than the speed $v_2$ of the truck and trailer.

At a first time (1) the ACC function begins to influence the tractor unit's speed by lowering its actual speed $v_{pres}$ to the second speed $v_2$ and thereby preventing the tractor unit from colliding with the truck and trailer. Thereafter the tractor unit's actual speed $v_{pres}$ is equal to that of the truck and trailer in front, i.e. $v_{pres} = v_2$, resulting thereafter in a substantially constant time gap between the vehicles.

At a second time (2), according to the present invention, the user adjusts the ACC's set speed $v_{set\,ACC}$ downwards on the basis of the tractor unit's current speed $v_{pres\,ACC}$ so that $v_{set\,ACC} = v_{pres\,ACC} - v_{adj}$. As may be seen in FIG. 4, this adjustment affects the set speed $v_{set\,ACC}$ in such a way that the tractor unit's actual speed $v_{pres}$ is also affected. As the adjustment of the set speed $v_{set\,ACC}$ is related to the current speed $v_{preS}$, the adjusted set speed $v_{set\,ACC}$ will be lower than the current speed $v_{pres}$, which will decrease to a lower value $v_3$ than the speed $v_2$ of the truck and trailer.

This will result in the tractor unit with ACC having a lower speed $v_3$ than the speed $v_2$ of the vehicle in front, so the distance between the two vehicles will increase again. This is illustrated by the distance graph at the bottom of FIG. 4, in which the distance between the tractor unit with ACC and the truck and trailer is represented by a continuous line. The distance decreases until at the first time (1) the ACC function lowers the tractor unit's actual speed $V_{pres\,ACC}$ to the same value as the truck and trailer, i.e. $V_{pres\,ACC} = v_2$, resulting after a while in the distance being constant. Thereafter the distance slowly increases again because the tractor unit's speed drops further, so that $V_{pres\,ACC} = v_3$, on the basis of the input.

Here the tractor unit's actual speed $V_{pres\,ACC}$ is thus influenced by inputs from a user/driver. A driver will thus feel that his/her inputs are of great significance and that he/she has real control over the vehicle.

FIG. 4 also illustrates what the speed and distance between the vehicles would be like if the tractor unit was equipped with a conventional cruise control (CC) not using radar to adjust the vehicle's speed on the basis of that of the vehicle in front. This was described above in relation to FIG. 3.

It should be noted here that the respective set speeds for the ACC and the conventional cruise control, viz. $v_{set\,ACC}$ and $v_{set\,CC}$, are eventually different in this example, i.e. $v_{set\,ACC} \neq v_{set\,CC}$, and that the respective constant speed brake speeds $v_{dhsc\,ACC}$ and $V_{dhsc\,CC}$ are different in this example, i.e. $v_{dhsc\,ACC} \neq v_{dhsc\,CC}$.

As mentioned above, the reference-speed-regulating cruise control endeavours where possible to keep the vehicle's speed within the range between an overall lowest permissible speed $v_{min\,glob}$ and an overall highest permissible speed $v_{max\,glob}$.

According to an embodiment of the present invention, the user's input results in the set speed $v_{set}$ being set to a value corresponding to whichever is greater of the current speed $v_{pres}$ and an overall lowest permissible speed $v_{min\,glob}$. In other words, whichever is the greater will then be used as a new value for the set speed $v_{set}$.

According to another embodiment of the present invention, the driver's input results in the set speed $v_{set}$ being set to a value corresponding to whichever is smaller of the current speed $v_{pres}$ and the overall highest permissible speed $v_{max\,glob}$. In other words, whichever is the smaller is then used as a new value for the set speed $v_{set}$.

It is highly advantageous from a traffic safety perspective that the driver of a vehicle can concentrate on driving and can focus his/her attention on the section of road ahead. It is therefore highly advantageous to be able to control the set speed $v_{set}$ simply and by few inputs.

According to an embodiment of the invention, an adjustment made to the set speed $v_{set}$ applies until a new value is chosen for the set speed $v_{set}$, i.e. until a new set speed $v_{set}$ is chosen by input from a user of the reference-speed-regulating cruise control. This is advantageous in that the driver may then have a feeling of having full control of the set speed $v_{set}$.

According to an embodiment of the present invention, user input may be by means of one or more input devices, e.g. one or more from among a button, a lever, a knob, a pedal, a touchscreen, a voice input device and a menu choice, e.g. on a visual display screen. Substantially all types of input devices might be used by a driver to put information into the reference-speed-regulating cruise control according to the invention.

FIG. 5 illustrates a non-limitative example of an input device in the form of a button which may be used according to the invention. This button is accessible in the driver's cab. It may for example be situated on the steering wheel and therefore be easy for the driver to reach.

Possible applications of various embodiments described above of the invention are described below on the basis of the button in FIG. 5. These applications represent non-limitative examples of using the invention and are described to increase understanding of the invention. Similar applications may of course be implemented with any of the input devices described above other than the button in FIG. 5.

According to a first example, the reference speed $v_{ref}$ is initially lower than the set speed $v_{set}$, e.g. because the reference-speed-regulating cruise control is an ACC and a vehicle in front is travelling more slowly than the user-chosen set speed $v_{set}$. In the embodiments exemplified below, the magnitude adopted for the respective upward and downward adjustments $v_{adj}$ of the set speed $v_{set}$ is one (1).

According to the embodiment described above of the invention, when the adjustment based on the input results in the set speed $v_{set}$ being set to a value $v_{pres}$ of the current speed so that $v_{set}=v_{pres}$, the following respective inputs by means of the button in FIG. 5 may produce the following results in this first example:

Input="A": no effect on $v_{set}$
Input="B": $v_{set}=V_{set,\,old}+1$
Input="C": $v_{set}=v_{pres}$
Input="D": cruise control switched off According to the embodiment described above of the invention, when the adjustment based on the input results in the set speed $v_{set}$ being set to a downwardly adjusted value $v_{pres}-v_{adj}$ of the current speed so that $v_{set}=v_{pres}-v_{adj}$, the following respective inputs by means of the button in FIG. 5 may produce the following results in this first example:

Input="A": no effect on $v_{set}$
Input="B": $v_{set}=v_{set,\,old}+1$
Input="C": $v_{set}=v_{pres}-1$
Input="D": cruise control switched off According to a second example, the reference speed $v_{ref}$ is initially higher than the set speed $v_{set}$, e.g. before an upgrade before which the reference speed $v_{ref}$ is allowed to be raised in the reference-speed-regulating cruise control.

According to the embodiment described above of the invention, when the adjustment based on the input results in the set speed $v_{set}$ being set to a value $v_{pres}$ of the current speed so that $v_{set}=v_{pres}$, the following respective inputs by means of the button in FIG. 5 may produce the following results in this second example:

Input="A": no effect on $v_{set}$
Input="B": $v_{set}=v_{pres}$
Input="C": $v_{set}=v_{set,\,old}-1$
Input="D": cruise control switched off According to the embodiment described above of the invention, when the adjustment based on the input results in the set speed $v_{set}$ being set to an upwardly adjusted value $v_{pres}+v_{adj}$ of the current speed so that $v_{set}=v_{pres}+v_{adj}$, the following respective inputs by means of the button in FIG. 5 may produce the following results in this second example:

Input="A": no effect on $v_{set}$
Input="B": $v_{set}=v_{pres}+1$
Input="C": $v_{set}=v_{set,\,old}-1$
Input="D": cruise control switched off According to an embodiment of the present invention, both upward and downward adjustments of the set speed $v_{set}$ are based on the current speed $v_{pres}$. In this embodiment the following respective inputs by means of the button in FIG. 5 may produce the following results in this second example:

Input="A": no effect on $v_{set}$
Input="B": $v_{set}=v_{pres}+1$
Input="C": $v_{set}=v_{pres}-1$
Input="D": cruise control switched off In the above examples, the magnitude of the respective upward and downward adjustments $v_{adj}$ of the set speed $v_{set}$ is exemplified by the value one (1), but their magnitude according to the invention might also assume other values. The respective upward and downward adjustments $v_{adj}$ have according to the invention a value related to the magnitude of the set speed $v_{set}$, e.g. they may have a value corresponding to a percentage x of the set speed $v_{set}$, so that $v_{adj}=v_{set}*X\%$. According to an embodiment of the invention, the user may him/herself choose the magnitude of the respective upward and downward adjustments $v_{adj}$.

FIG. 6 is a flowchart for the method according to the present invention. The method begins at a first step [601]. As a second step [602] adjustment of at least the set speed $v_{set}$ is allowed when the reference speed $v_{ref}$ differs from the set speed $v_{set}$. As a third step [603] the adjustment is at least partly based on user input and on the current speed $v_{pres}$.

The present invention relates also to a reference-speed-regulating cruise control arranged to demand from an engine system a reference speed $v_{ref}$ which may differ from a chosen set speed $v_{set}$. The reference-speed-regulating cruise control according to the invention comprises an adjustment unit adapted to allow adjustment of at least the set speed $v_{set}$ when it differs from the reference speed $V_{ref}$, i.e. when $v_{ref} \neq v_{set}$. The adjustment unit is also adapted to basing base the adjustment at least partly on a current speed $v_{pres}$ of the vehicle and on input from a user of the reference-speed-regulating cruise control.

One skilled in the art will appreciate that a method for a reference-speed-regulating cruise control according to the present invention may also be implemented in a computer program which, when executed in a computer, causes the computer to apply the method. The computer program usually takes the form of a computer program product 703 in FIG. 7 stored on a digital storage medium, and is contained in such a product's computer-readable medium which comprises a suitable memory, e.g. ROM (read-only memory), PROM (programmable read-only memory), EPROM (erasable PROM), flash memory, EEPROM (electrically erasable PROM), a hard disc unit, etc.

FIG. 7 depicts schematically a control unit 700 comprising a calculation unit 701 which may take the form of substantially any suitable type of processor or microcomputer, e.g. a circuit for digital signal processing (digital signal processor, DSP), or a circuit with a predetermined specific function (application specific integrated circuit, ASIC). The calculation unit 701 is connected to a memory unit 702 which is situated in the control unit 700 and which provides the calculation unit with, for example, the stored program code and/or stored data which the calculation unit needs to enable it to do calculations. The calculation unit is also adapted to storing partial or final results of calculations in the memory unit.

The control unit 700 is further provided with respective devices 711, 712, 713, 714 for receiving and sending input and output signals. These input and output signals may comprise waveforms, pulses or other attributes which the input signal receiving devices 711, 713 can detect as information and which can be converted to signals which the calculation unit 701 can process. These signals are then supplied to the calculation unit. The output signal sending devices 712, 714 are arranged to convert signals received from the calculation unit 701, e.g. by modulating them, in order to create output signals which can be conveyed to other parts of the reference-speed-regulating cruise control.

Each of the connections to the respective devices for receiving and sending input and output signals may take the form of one or more from among a cable, a data bus, e.g. a CAN (controller area network) bus, an MOST (media oriented systems transport) bus or some other bus configuration, or a wireless connection.

One skilled in the art will appreciate that the aforesaid computer may take the form of the calculation unit 701 and that the aforesaid memory may take the form of the memory unit 702.

One skilled in the art will appreciate that the above system may be modified according to the various embodiments of the method according to the invention. The invention relates also to a motor vehicle, e.g. a car, truck or bus, provided with at least one reference-speed-regulating cruise control according to the invention.

The present invention is not restricted to its embodiments described above but relates to and comprises all embodiments within the protective scope of the following claims.

The invention claimed is:

1. A method for a reference-speed-regulating cruise control which outputs a reference speed $v_{ref}$ to an engine of a vehicle to control said engine of said vehicle, said reference speed $v_{ref}$ being such that it will not always be equal to a set speed $v_{set}$ input to said reference-speed-regulating cruise control, said reference speed $v_{ref}$ being such it may be set by the reference-speed-regulating cruise control without any input from a user of said reference-speed-regulating cruise control, the method comprising adjusting at least said set speed $v_{set}$ when said reference speed $v_{ref}$ differs from said set speed $v_{set}$, and basing said adjustment at least partly on a current speed $v_{pres}$ of said vehicle and on input from a user of said reference-speed-regulating cruise control, said input from said user of said reference-speed-regulating cruise control causing said adjustment of said set speed $v_{set}$ to occur, without switching off said reference-speed-regulating cruise control, said input from said user of said reference-speed-regulating cruise control causing a first adjustment of said set speed $v_{set}$ when said reference speed $v_{ref}$ is lower than said set speed $v_{set}$, said first adjustment of said set speed $v_{set}$ being different than a second adjustment of said set speed $v_{set}$, said input from said user of said reference-speed-regulating cruise control causing said second adjustment of said set speed $v_{set}$ when said reference speed $v_{ref}$ is higher than said set speed $v_{set}$.

2. A method according to claim 1, wherein said adjusting is for causing said set speed $v_{set}$ to be set to said current speed $v_{pres}$ so that $v_{set}=v_{pres}$.

3. A method according to claim 1, wherein said adjusting is for causing said set speed $v_{set}$ to be set to an upwardly adjusted value $v_{pres}+v_{adj}$ of said current speed so that $v_{set}=v_{pres}+v_{adj}$.

4. A method according to claim 1, wherein said adjusting is for causing said set speed $v_{set}$ to be set to a downwardly adjusted value $v_{pres}-v_{adj}$ of said current speed so that $v_{set}=v_{pres}-v_{adj}$, wherein $v_{adj}$ is not equal to zero.

5. A method according to claim 1, wherein said adjusting is for causing said set speed $v_{set}$ to be set to a value corresponding to whichever is greater of said current speed $v_{pres}$ and an overall lowest permissible speed $v_{min\ glob}$.

6. A method according to claim 1, wherein said adjusting is for causing said set speed $v_{set}$ to be set to a value corresponding to whichever is smaller of said current speed $v_{pres}$ and an overall highest permissible speed $v_{max\ glob}$.

7. A method according to claim 1, wherein said adjusting of said set speed $v_{set}$ is applicable until a new value is input for said set speed $v_{set}$.

8. A method according to claim 1,
further comprising effecting said input by means of at least one of
input devices selected from:
a button,
a lever,
a knob,
a pedal,
a touchscreen,
a voice input device and
a menu choice.

9. A method according to claim 1, further comprising said reference-speed-regulating cruise control is
either an adaptive cruise control (ACC)
or a cruise control which uses knowledge about road sections ahead.

10. A computer program product comprising a non-transitory computer-readable medium which contains a computer program which comprises program code and which, when said program code is executed in a computer, causes said computer to apply the method according to claim 1.

11. A reference-speed-regulating cruise control configured to output a reference speed $v_{ref}$ to an engine of a vehicle to control said engine of said vehicle, said reference speed $v_{ref}$ being such that it will not always be equal to a set speed $v_{set}$ input to said reference-speed-regulating cruise control, said reference speed $v_{ref}$ being such that it may be set by the reference-speed-regulating cruise control without any input from a user of said reference-speed-regulating cruise control, said reference-speed-regulating cruise control comprising an adjusting unit configured to adjust at least said set speed $v_{set}$ when said reference speed $v_{ref}$ differs from said set speed $v_{set}$, and to base said adjustment at least partly on a current speed $v_{pres}$ of said vehicle and on input from a user of said reference-speed-regulating cruise control, said input from said user of said reference-speed-regulating cruise control causing said adjustment of said set speed $v_{set}$ to occur, without switching off said reference-speed-regulating cruise control, said input from said user of said reference-speed-regulating cruise control causing a first adjustment of said set speed $v_{set}$ when said reference speed $v_{ref}$ is lower than said set speed $v_{set}$, said first adjustment of said set speed $v_{set}$ being different than a second adjustment of said set speed $v_{set}$, said input from said user of said reference-speed-regulating cruise control causing said second adjustment of said set speed $v_{set}$ when said reference speed $v_{ref}$ is higher than said set speed $v_{set}$.

* * * * *